United States Patent [19]

Barron

[11] 4,024,895
[45] May 24, 1977

[54] PRODUCT REINFORCING FABRIC AND TWO-COMPONENT WEFT YARN USEFUL THEREIN

[75] Inventor: Eugene R. Barron, Wilmington, Del.

[73] Assignee: E. I. Du Pont de Nemours and Company, Wilmington, Del.

[22] Filed: Mar. 24, 1976

[21] Appl. No.: 670,077

[52] U.S. Cl. .............................. 139/426 R; 57/144; 152/358

[51] Int. Cl.² ................... D02G 3/48; D03D 15/00

[58] Field of Search .......... 57/139, 140 R, 140 BY, 57/144, 152, 163; 152/330, 354, 355, 357, 358, 359; 139/426 R

[56] References Cited

UNITED STATES PATENTS

| | | | |
|---|---|---|---|
| 2,745,240 | 5/1956 | Brant | 57/140 BY |
| 2,755,214 | 7/1956 | Lyons et al. | 57/140 BY X |
| 2,890,567 | 6/1959 | Taylor et al. | 57/140 BY |
| 3,395,744 | 8/1968 | Wolf et al. | 152/358 |
| 3,429,354 | 2/1969 | Brooks | 57/149 X |
| 3,455,100 | 7/1969 | Sidles et al. | 57/163 X |
| 3,486,546 | 12/1969 | Sidles et al. | 57/144 X |
| 3,534,782 | 10/1970 | Young et al. | 57/140 BY |
| 3,677,318 | 7/1972 | Glass et al. | 152/358 X |
| 3,772,872 | 11/1973 | Piazza et al. | 57/140 R |
| 3,863,683 | 2/1975 | Guyot | 139/426 R |

Primary Examiner—Donald Watkins

[57] ABSTRACT

A reinforcing fabric comprising a web of tire cords maintained in spaced relationship with sheath-core weft yarns having a cotton sheath about a core of spin-oriented polyester filaments. The weft yarns have a high initial modulus and a high break elongation which is substantially retained after heat aging the yarn at 450° or 475° F. The fabric is particularly useful as reinforcement in radial tire constructions.

8 Claims, 2 Drawing Figures

PRODUCT REINFORCING FABRIC AND TWO-COMPONENT WEFT YARN USEFUL THEREIN

BACKGROUND OF THE INVENTION

This invention relates to tire-reinforcement fabric composed of warp cords of synthetic organic filaments, glass or wire, and weft yarns for maintaining the cords in properly spaced relationship. The invention is more particularly concerned with improvements in the weft yarns.

The use of reinforcing fabric in tires is disclosed in Wolf et al. U.S. Pat. No. 3,395,744. Plies of strong cords are used to reinforce the tire. The purpose of the weft yarns is merely to maintain the cords in spaced relationship during processing of fabric plies and construction of the tire. Cotton weft yarns have been used for bias ply constructions to maintain uniform spacing of the cords, but they are not satisfactory for radial ply constructions.

The carcass of a radial tire is normally assembled on a flat drum and is then expanded to a toroidal shape. Space between cords in the crown of the tire is thereby increased to at least 75 percent over the original value. Cotton weft yarns break at about 12 percent or less elongation and the fabric splits at the breaks to leave gaps, since the weft yarns restrain the warp cords in unbroken weft areas. Proper cord spacing is particularly critical in monoply radial tires. If x-ray observation shows that the cord spacing is not acceptably uniform, the tire must be downgraded or even rejected.

The Wolf et al. patent states that a weft yarn of a form of nylon filaments commonly referred to by the art as unoriented (undrawn) nylon has been found to be particularly successful, and that the weft yarn can consist essentially of other crystalline resins possessing the proper elongation when in an unoriented state. A polyester of the type described in Whinfield and Dickson U.S. Pat. No. 2,465,319 dated Mar. 22, 1949, is mentioned. Such weft yarns have high elongation as produced, but the break elongation quickly drops to less than 50 percent when the weft yarn is exposed to the temperatures of 400°–450° F (204°–232° C) used with recent warp cord materials. Furthermore, cotton weft yarns have a substantially higher initial modulus which is desirable to minimize cord distortion during fabric processing steps of coating, calendering and assembling the tire carcass.

SUMMARY OF THE INVENTION

The present invention provides a high-elongation weft yarn having an initial modulus which is adequate to maintain warp cords properly spaced during fabric processing, and having a retained elongation at temperatures over 400° F (204° C) which substantially eliminates breakage during shaping of radial ply tires and which results in a more uniform distribution of warp cords in the completed tire.

The invention is an improved weft yarn for reinforcing fabric having a web of tire cords maintained in spaced relationship by weft yarns, wherein the weft yarn comprises a cotton sheath twisted about a core of spin-oriented polyester filaments. The weft yarn has an initial modulus of at least 15 grams per denier and a break elongation of 100 to 150 percent when tested before heating, and has an initial modulus of at least 15 grams per denier and a break elongation of at least 75 percent when tested after heat aging at 450° F (232° C) for 2 minutes as defined hereinafter.

As used herein, "spin-oriented polyester filaments" refers to continuous filaments prepared by melt-spinning polyester and withdrawing the filaments from the spinneret at a take-off speed of at least 3,000 yards per minute (2,740 meters/minute) to provide a break elongation of at least 100 percent (preferably 120–180%). The take-off speed refers to the speed of the solidified filaments at windup or at a roll for forwarding the filaments to subsequent processing. Polyester consisting essentially of polyethylene terephthalate is preferred.

The cotton sheath is applied to the polyester core by conventional means used for preparing sheath-core yarns. The polyester core should be 35 to 65 percent of the total weight of the weft yarn. The polyester core can be from 80 to 240 denier, preferably being about 100 denier.

DETAILED DESCRIPTION

Figure 1:
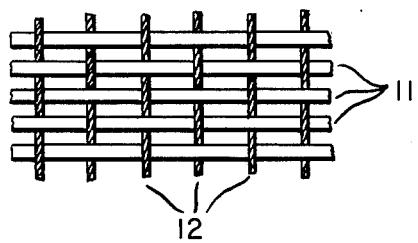
Figure 2:
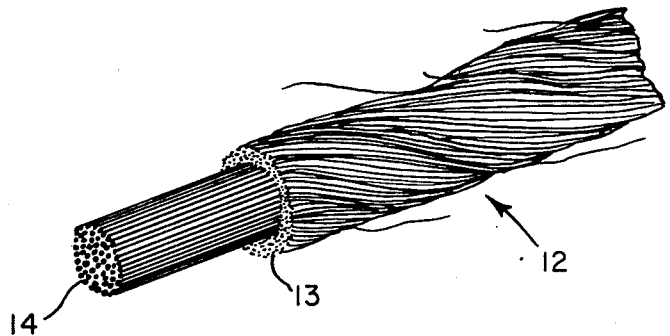

In the drawings,

FIG. 1 represents a portion of a reinforcing fabric having a web of tire cords 11 maintained in spaced relationship by weft yarns 12, and FIG. 2 is a greatly enlarged representation of a weft yarn 12 which comprises a cotton sheath 13 twisted about a core 14 of spin-oriented polyester filaments. In FIG. 2 a portion of the core is shown without the cotton sheath in order to facilitate an understanding of the yarn structure.

The spin-oriented polyester filaments, forming the core of the sheath-core weft yarns, are prepared by melt-spinning polyester into filaments at a take-off speed of at least 3,000 yards/minute (2,740 meters/minute) as disclosed in Piazza and Reese U.S. Pat. No. 3,772,872. The break elongation of the filaments can be varied by changing the take-off speed. The break elongation decreases with increasing take-off speeds and the maximum speed is one which will provide a break elongation of at least 100 percent under the spinning conditions used. A typical process for producing a yarn of spin-oriented filaments is as follows:

Polyethylene terephthalate of 20 relative viscosity is melt-spun at 284° C, using a spinneret having 34 round orifices, each orifice being 0.28 millimeters wide and 0.51 millimeters deep, and winding up the filaments at 3,400 yards/minute (3,110 meters/minute). The yarn is interlaced to a pin count of 40 centimeters during its travel to the windup, as disclosed in U.S. Pat. No. 3,772,872. The yarn has a birefringence of 0.038 and a break elongation of 120 percent.

A cotton sheath is applied to the core of polyester filaments by twisting a cotton roving around the core. The example illustrates the use of conventional cotton system ring-spinning technology. The weights of polyester core and cotton used are adjusted to provide a sheath-core yarn in which the core is 35% to 65% of the total weight of the yarn. When the sheath-core yarn is stretched, the cotton provides a high initial modulus but breaks at a low elongation; the polyester core must then be able to stretch independently of the cotton to provide a break elongation of at least 100 percent.

A reinforcing fabric is woven with a web of tire cords maintained in parallel spaced relationship by weft (pick) yarns. The construction will vary, depending upon the intended use, but about two picks per inch (0.8 picks/cm.) for the weft yarns is common. The fabric is coated before it is assembled with the other components of a tire. A standard two-step hot stretching process may be used, similar to that illustrated in Krysiak U.S. Pat. No. 3,222,238. A first dip-coat of adhesive is applied and cured to improve adhesion of the polyester to rubber. A standard resorcinol-formaldehyde-latex (RFL) dip-coat is then applied and cured. Curing temperatures of about 450° to 475° F (232° to 246° C) are commonly used for radial tire constructions.

TEST METHODS

Measurements indicated herein are determined as follows:

Tenacity, initial modulus and break elongation are measured according to the ASTM designation D-2256-69 (incorporating editorial edition of Section 2 and renumbering of subsequent sections as done in March, 1971). It is defined as in Option 3.3 "Elongation at Break" of Section 3. The testing is performed on straight multifilament yarns which were conditioned by storing them at 65 percent relative humidity and 70° F (21.1° C) for 24 hours prior to testing. An Instron Tensile Testing Machine is used. The test sample is 5 inches (12.7 cm) long, no twist is added, the cross-head speed is 10 inches/minute (25.4 cm/min), the rate of attenuation is 200 percent/minute, and the chart speed is 5 inches/minute (12.7 cm/min). Tenacity is the maximum load in grams, before the yarn breaks, divided by the denier of the yarn.

Tests of yarns after heat aging (instead of conditioning at 70° F) are made in the same manner. The yarn is heated at 450° F (232° C) or 475° F (246° C) for 2 minutes in an oven while under sufficient tension to prevent shrinkage.

Relative Viscosity (RV) values of polyesters are a measure of the molecular weight. Relative Viscosity (RV) is the ratio of the viscosity of a solution of 0.8 gm of polymer dissolved at room temperature in 10 ml of hexafluoroisopropanol, to the viscosity of the hexafluoroisopropanol itself, both measured at 25° C in a capillary viscometer and expressed in the same units.

Birefringence is measured by the retardation technique described in "Fibres from Synthetic Polymers" by R. Hill (Elsevier Publishing Company, New york, 1953), pages 266–268, using a polarizing microscope with rotatable stage together with a Berek compensator or cap analyzer and quartz wedge. The birefringence is calculated by dividing the measured retardation by the thickness of the fiber, expressed in the same units as the retardation.

EXAMPLE

Conventional cotton system ring spinning technology is used to prepare the sheath-core yarn. Seven ends of a commercial 50 grain carded cotton sliver are processed on a Saco-Lowell DE-7C Versamatic Drawing Frame into a 58 grain sliver (1 pass, 6.0X draft). The drawn sliver is then processed into a 1.6 hank roving on a Saco-Lowell FS-2 Roving Frame (11.1 X draft). The sheath-core yarn is prepared on a Saco-Lowell spinning frame, a single roving being fed to each spinning position. The spin-oriented polyethylene terephthalate core yarn, a commerically available 100 denier, 34 filament yarn with about 120% elongation at break, sold by E. I. duPont de Nemours, Inc., is fed to the last drafting roll by appropriate guides and a tensioning device to maintain very low tension. Spinning conditions are: 29.3 X draft, 19.2 Z tpi, No. 3 traveler, and 6,000 rpm. Spin tubes are twist set using the following conditions: 90 minutes at 180° F (82° C) dry bulb and 170° F (77° C) wet bulb. Twist-set yarns are coned on a Schlafhorst Auto-Coner; slub catchers are left open and a wax applied. This yarn has the following properties:

TABLE

| Description of Yarn | | | | |
|---|---|---|---|---|
| Yarn Size: | 23.7/1 cc (224 denier) | | | |
| Sheath: | Carded cotton (124 denier) | | | |
| Core: | 100 – 34 Spin-Oriented Polyester | | | |
| Composition: | 55/45 Cotton/Polyester | | | |
| Twist Multiplier: | 4.0 | | | |
| Properties | Tenacity E = 7% | (gpd) Break | Initial Modulus(gpd) | Elongation(%) |
| As-spun | 0.92 | 1.17 | 19.1 | 106 |
| Aged 2 min. at 450° F | 0.88 | 1.20 | 16.3 | 98 |
| Aged 2 min. at 475° F | 1.09 | 1.40 | 15.0 | 98 |

The core-spun yarn described above is used as a pick yarn to prepare a 2000 denier (1000/½ cord construction), polyester carcass fabric with two picks per inch (0.8 picks per cm.). A 63 inch (160 cm.) wide fabric is woven on a Draper X-3 loom. The resulting fabric is processed with a standard two-step hot stretching process at 80 ypm (73.2 mpm). After application of the first dip, fabric is cured 1 minute in an oven at 475° F (246° C). Then a second dip is applied. The fabric is dried 1 minute in a second oven at 360° F (182° C) and finally cured for 1 minute in a third oven at 460° F (238° C). The treated polyester carcass fabric is 54 inches (137.2 cm) wide and has 29 cords per inch (11.4 cords per cm). Elongation of pick yarns removed from the processed fabric is 120%, when tested at 0.29 inch (0.74 cm) gage length. This fabric is made into a 2-ply polyester carcass, steel-bolted radial passenger tire. Carcass cord-to-cord spacing problems (e.g., undulations in the side walls), are considerably reduced in these tires as compared with tires made with carcass fabrics which contain conventional cotton pick yarns.

I claim:

1. In a reinforcing fabric having a web of tire cords maintained in spaced relationship by weft yarns, an improved weft yarn comprising a cotton sheath twisted about a core of spin-oriented polyester filaments, which yarn has an initial modulus of at least 15 grams per denier and a break elongation of 100 to 150 percent when tested before heating, and which has an initial modulus of at least 15 grams per denier and a break elongation of at least 75 percent when tested after heat aging 450° F for 2 minutes.

2. A fabric as defined in claim 1 wherein the polyester core is from 35 to 65 percent of the total weight of the weft yarn.

3. A fabric as defined in claim 2 wherein the polyester core is from 80 to 240 denier.

4. A fabric as defined in claim 3 wherein the polyester core has a break elongation of 120 to 180 percent when tested before heating.

5. A yarn comprising a cotton sheath twisted about a core of spin-oriented polyester filaments, which yarn has an initial modulus of at least 15 grams per denier and a break elongation of 100 to 150 percent when tested before heating, and which has an initial modulus of at least 15 grams per denier and a break elongation of at least 75 percent when tested after heat aging at 450° F for 2 minutes.

6. A yarn as defined in claim 5 wherein the polyester core is from 35 to 65 percent of the total weight of the yarn.

7. A yarn as defined in claim 6 wherein the polyester core is from 80 to 240 denier.

8. A yarn as defined in claim 7 wherein the polyester core has a break elongation of 120 to 180 percent when tested before heating.

* * * * *